(12) United States Patent
Coronado et al.

(10) Patent No.: US 7,148,180 B2
(45) Date of Patent: *Dec. 12, 2006

(54) COMPOSITES FOR REMOVING METALS AND VOLATILE ORGANIC COMPOUNDS AND METHOD THEREOF

(75) Inventors: Paul R. Coronado, Livermore, CA (US); Sabre J. Coleman, Oakland, CA (US); John G. Reynolds, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/794,853

(22) Filed: Mar. 4, 2004

(65) Prior Publication Data

US 2004/0169157 A1    Sep. 2, 2004

Related U.S. Application Data

(63) Continuation-in-part of application No. 10/285,242, filed on Oct. 30, 2002, now Pat. No. 6,806,227.

(51) Int. Cl.
*B01J 27/182* (2006.01)

(52) U.S. Cl. .................................................. 502/214

(58) Field of Classification Search ................ 502/232, 502/214, 405, 408; 252/60, 184, 182.3, 182.35; 423/445 R, 449.3
See application file for complete search history.

(56) References Cited

U.S. PATENT DOCUMENTS

| 5,547,794 A | * | 8/1996 | Demizu et al. | .......... 430/108.1 |
| 5,817,239 A | * | 10/1998 | Tavlarides et al. | .......... 210/661 |
| 5,948,726 A | * | 9/1999 | Moskovitz et al. | ......... 502/415 |

* cited by examiner

*Primary Examiner*—Edward M. Johnson
(74) *Attorney, Agent, or Firm*—Ann M. Lee; Alan H. Thompson

(57) ABSTRACT

Functionalized hydrophobic aerogel/solid support structure composites have been developed to remove metals and organic compounds from aqueous and vapor media. The targeted metals and organics are removed by passing the aqueous or vapor phase through the composite which can be in molded, granular, or powder form. The composites adsorb the metals and the organics leaving a purified aqueous or vapor stream. The species-specific adsorption occurs through specific functionalization of the aerogels tailored towards specific metals and/or organics. After adsorption, the composites can be disposed of or the targeted metals and/or organics can be reclaimed or removed and the composites recycled.

30 Claims, 11 Drawing Sheets

Figure 9

| Sample Identification | 1,1-DCE ppmv | TCE ppmv | PCE ppmv | CHCl₃ ppmv | Detection Limits ppmv | Total Analyzed ppmv |
|---|---|---|---|---|---|---|
| Sample A influent | 68 | 112 | 113 | ND | 0.200 | 293 |
| Sample A composite | ND | 1.0 | 2.7 | ND | 0.200 | 4 |
| Sample B influent | 69 | 113 | 114 | ND | 0.200 | 296 |
| Sample B composite | 2.5 | 5.8 | 12 | ND | 0.200 | 20 |
| Sample C influent | 67 | 111 | 112 | ND | 0.200 | 290 |
| Sample C composite | 5 | 1.5 | 1.2 | ND | 0.200 | 8 |

ND = Not Detected (at or below detection limit)

| Sample | C, wt % | P, wt % | Si, wt % | F, wt % |
|---|---|---|---|---|
| EXAMPLE 1 | 85.42 | 0.25 | 0 | 0 |
| EXAMPLE 2 | 78.35 | 0.06 | 4.14 | 1.73 |
| EXAMPLE 3 | 76.09 | 0.97 | 4.49 | 1.48 |
| EXAMPLE 4 | 77.98 | 0.99 | 2.74 | 0.43 |
| EXAMPLE 5 | 83.00 | 0.66 | 2.69 | 0.77 |

COMPOSITES FOR REMOVING METALS AND VOLATILE ORGANIC COMPOUNDS AND METHOD THEREOF

RELATED APPLICATION

This application is a continuation in part of U.S. application Ser. No. 10/285,242 filed Oct. 30, 2002 now U.S. Pat. No. 6,806,227.

The United States Government has rights in this invention pursuant to Contract No. W-7405-ENG-48 between the United States Department of Energy and the University of California for the operation of Lawrence Livermore National Laboratory.

BACKGROUND OF THE INVENTION

Substantial effort has been directed to the removal of contaminants from an aqueous media, such as ground water and precious metal recovery from such activities such as mining or plating operations. Numerous "Superfund" sites have been established because of contamination of ground water, surface waters, and soils by various materials. The main contaminants are metals, particularly uranium and hexavalent chromium, volatile organic compounds (VOCs), high explosive compounds, nitrates, perchlorates, and tritium, as well as various commercial and manufacturing waste contaminants.

Presently, granular activated carbon (GAC), ion-exchanged resins, air-strippers, and bioremediation are used for contaminate removal. These work on many contaminants. However, there is not a readily available cost-effective remedy for uranium and other metals, especially in combination with VOCs.

GAC has been commercially used as an adsorbent for contaminants in water; e.g. surface water, ground water, and industrial processes. It is cheap and treatment technology hardware is readily available commercially for its use. Even though GAC is a good adsorbent medium for many contaminants, such as VOCs, it is not as efficient for certain metals, particularly uranium, hexavalent chromium, and gold. Thus, there has been a need for a material by which contaminating metals and certain organic compounds may be removed from aqueous media.

SUMMARY OF THE INVENTION

An aspect of the invention includes a method comprising: providing a dried hydrophobic sol-gel on a solid support structure, wherein said dried hydrophobic sol-gel is functionalized with at least one metal-removing constituent and/or at least one VOC-removing constituent; and contacting said dried hydrophobic sol-gel on a solid support structure to an aqueous or vapor sample.

Another aspect of the invention includes a method comprising: forming a first mixture comprising a predetermined amount of at least one organosilane compound a predetermined amount of an organosilane compound having a substituent capable of making an aerogel hydrophobic, and an organic solvent; forming a second mixture comprising a compound capable of binding at least one metal or a compound capable of being modified to a compound capable of binding at least one metal after gellation and an organic solvent; mixing the first mixture and the second mixture together with stirring for a predetermined amount of time to form a pre-aerogel mixture; combining said pre-aerogel mixture with a predetermined amount of a solid support structure to form a pre-aerogel/support structure mixture; and drying said pre-aerogel/support structure under supercritical conditions to form a functionalized hydrophobic aerogel/support structure solid material capable of removing metals from an aqueous media.

A further aspect of the invention includes a composition comprising: a predetermined amount of a hydrophobic aerogel functionalized with at least one metal-removing constituent; and a predetermined amount of granulated activated carbon.

A further aspect of the invention includes a composition comprising: a mixture consisting essentially of (1) a dried hydrophobic sol-gel functionalized with at least one metal-removing constituent and (2) a solid support structure.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 9 shows the results of a VOC vapor adsorption column test using a stainless steel column loaded with 293.5 g of hydrophobic aerogel/GAC composite.

FIG. 10 shows the results of elemental analysis of hydrophobic aerogel/GAC composites.

DETAILED DESCRIPTION OF THE INVENTION

Figure 1:
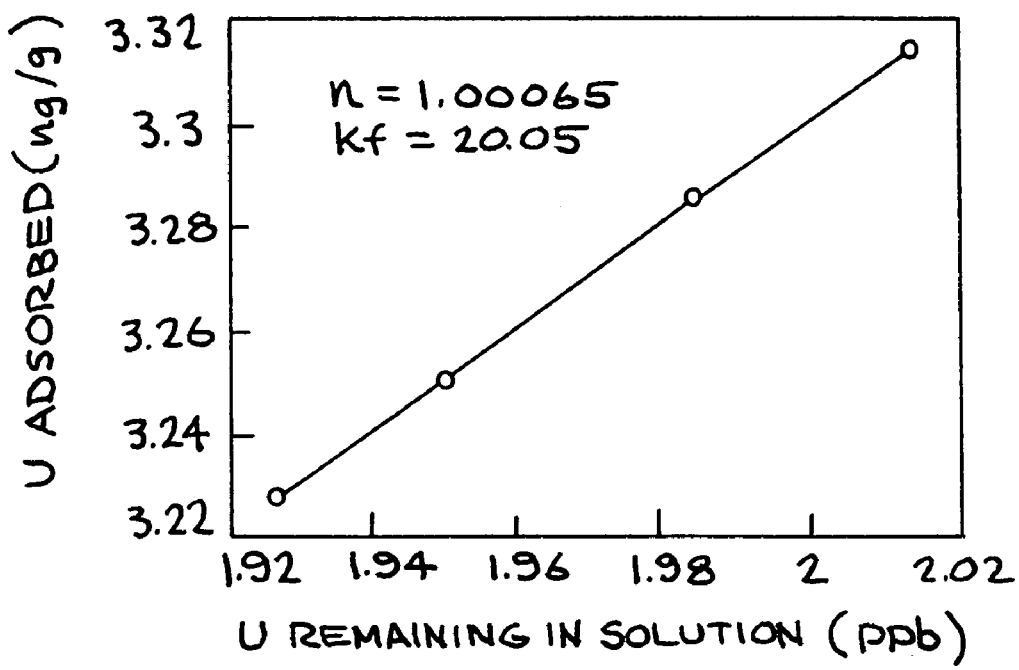
FIG. 1 shows a Freundlich isotherm plot for baseline granulated activated carbon (GAC).

Disclosed herein is a composition which can be used for removing metals, such as uranium, chromium, gold and organic compounds, such as gasoline or VOCs, from aqueous or vapor media using a solid material. Also disclosed is the fabrication method thereof. Solid materials are utilized and the metals or organic compounds are removed by passing the aqueous or vapor phase through the solid materials. The solid materials may be in molded, granular, or powder form. The metals and the organics are adsorbed by the solid materials leaving a purified stream. The solid materials are comprised of dried sol-gels (e.g., aerogels) and/or a mixture of a dried sol-gel and a solid support structure. Solid support structures with a high surface area (i.e., greater than or equal to 500 $m^2/g$) are effective. The species-specific adsorption occurs through specific chemical modifications of the solid materials tailored towards a target metal or organic of choice, such as uranium, chromium, gold or VOCs. The used solid materials can then be disposed of or recycled if the metals or organics can be removed from such solid materials.

The solid materials can be used to cleanup any aqueous stream. Of particular interest are aqueous streams with environmentally damaging material, such as those caused by commercial interests or military activities. Some examples include: ground water with uranium or heavy metal contamination; ground water with volatile organic compounds (VOCs) contamination; ground water contaminated with gasoline or other fuel spills; waste storage tanks with uranium or heavy metals; and surface waters with petroleum product contamination or fuel spills. Additionally, metal recovery from aqueous media, e.g., from mining activities, can benefit from this new material.

The solid materials disclosed herein may comprise a silica sol-gel, such as an aerogel, that has been modified to be hydrophobic and is activated by supercritical drying. Further modification is possible if the aerogel is mixed with a solid support such as GAC. This modification is effective to remove contaminants, particularly uranium, from aqueous streams. The silica aerogel by itself in the past has not been cost-effective. However, a composite with GAC can have less than 20% aerogel and be a much better adsorbent for uranium than any of the afore-mentioned treatment technologies.

GAC is a widely available commercial material that comes in many forms and from many sources. GAC by itself has been commercially used as an adsorbent for contaminants in water. It is inexpensive and the treatment technology hardware is readily available commercially for its use. It is a good media for adsorption of many other contaminants, such as VOCs, but without modification, it is not an efficient adsorbent of uranium. The aerogel/GAC composite is superior to previous treatment technologies, including GAC alone. Acid washed GAC used to form aerogel/GAC composites is effective.

Aerogels are nano-structured materials having high surface areas (around 500 $m^2/g$), low densities, and large meso pore structure. These nano-structured properties are configured in a three-dimensional structure giving ideal physical properties for adsorption. Through chemical modification, they can be designed to have species-specific binding, as well as discriminating bulk properties. Combining these properties, with the known adsorption properties of GAC as delineated by Tchobanoglous et al, Water Quality, Characteristics, Modeling and Modification, ISBN: 0-201-05433-7 (1985), hereby incorporated by reference, makes the aerogel/GAC composite ideal for treating environmentally important systems such as ground water.

Although the examples discussed herein are of aerogels, xerogels are expected to work efficiently as well. As used herein, dried sol-gel is defined as an aerogel or xerogel.

The superior performance of the aerogel/GAC composite is obtained by being able to tailor the aerogel to be specific for the particular target clean-up stream. This stream can be aqueous with metal ions, aqueous with organic compounds, aqueous with metal ions and organic compounds, or non-aqueous (i.e., vapor) with metal ions, organic compounds, or both. The aerogel/GAC composite design will depend upon all of the components of the stream. Aerogel/GAC composites can be tailored to be hydrophobic and absorb metals by inocorporating phosphoric acid, a phosphate exchangeable salt or a quantity of phosphonate into the composite. The concentration of the phosphoric acid, phosphonate or phosphate exchangeable salt can range from 0.5–50%.

In one embodiment of an aerogel/GAC composite, the aerogel is tailored to be hydrophobic and specific for adsorbing uranium. The backbone of the aerogel can be formed by the hydrolysis condensation of tetramethoxysilane (TMOS), or tetraethoxysilane (TEOS), i.e., silica sol-gel chemistry. Other commonly used methods found in the literature are also viable. For example, those taught by Brinker and Scherer, Sol-Gel Science, The Physics and Chemistry of Sol-Gel Processing, ISBN: 0-12-134970-5 (1989), which is hereby incorporated by reference. The hydrophobic component can be formed by the addition of a fluorinated substituent. The fluorinated substituent can be added through a co-condensation reaction with a propyl-$CF_3$ substituted siloxane, for example. The trifluoropropyl group is used only to demonstrate the effect of making the hydrophobic character, not to limit the method of production. Reynolds, Recent Research Developments in Non-Crystalline Solids, ISBN: 81-7895-028-6 (2001), which is hereby incorporated by reference, teaches common methods to make the material hydrophobic, but other substituents found in the literature can also be used. The uranium adsorption site is formed by the incorporation of a uranium specific binding material into or onto the aerogel and/or the aerogel/GAC composite. Phosphoric acid, phosphate exchanged calcium nitrate, and diethylphosphatoethylenetriethoxysilane are used to demonstrate the viability of the approach. Calcium nitrate is an example of a phosphate exchangeable salt and the concentration of the phosphate exchangeable salt in the aerogel/GAC composite can range from 0.5–50%. Other materials that have affinity for uranium can also be used. Materials that have affinity for other species are preferred in the cases where other metals and/or organics are targets for clean-up or separation. Materials such as hydroxyapatite (a calcium phosphate mineral that is a component of bone and also found in rocks and sea coral), calcium phosphate, and others can be used. The formation of the aerogel/GAC composite can be made by combining the backbone, hydrophobic component(s), and uranium binding components with the GAC. Co-gellation followed by supercritical extraction is an example of how the aerogel/GAC composite can be formed.

Three methods can be used to form an aerogel/GAC composite. The first method will be called the phosphoric acid modified method. In this case, phosphoric acid is added to the reaction mixture prior to gellation. The GAC is added to the supercritical reactor with the sol-gel precursors and a predetermined concentration of phosphoric acid dissolved in acetone. The system is closed, heated, and then supercritically extracted. Whatever remains is presumably the active ingredient. If the predetermined concentration of $H_3PO_4$ is 17%, then the material generated is called a 17% $H_3PO_4$ modified composite. Likewise, if the predetermined concentration of $H_3PO_4$ is 1% $H_3PO_4$, a 1% $H_3PO_4$ modified composite is generated.

The second method of incorporation comprises forming a slurry of calcium nitrate in acetone, and adding the slurry before gellation. The GAC is added to the supercritical reactor with the sol-gel precursors along with the slurry. The system is closed, heated, and then supercritically extracted and an aerogel is formed. Phosphoric acid is then dissolved in acetone and run through the aerogel to exchange some of the nitrate for phosphate. The material generated is called a calcium modified composite.

The third method utilizes the reactions that permit the chemical modification of the hydrophobic bulk material previously discussed, e.g., an aerogel containing propyl-$CF_3$ as the hydrophobic functional group. In this third synthetic method, a phosphonate functional group is co-condensed, in addition to the propyl-$CF_3$ group to yield a hydrophobic aerogel with metal binding capability (through the phosphonate functional group) called a phosphonate modified composite.

The following are examples of the solid material (aerogel) formulation of the invention in practice. All samples were tested using a modified ASTM D 3860-98 method (Standard Practice for Determination of Adsorptive Capacity of Activated Carbon by Aqueous Phase Isotherm Technique). Stock solutions of uranium were prepared at either approximately 25, 50, or 100 ppb at pH 7 for sorption testing.

EXAMPLE 1

Baseline granulated activated carbon (GAC) was tested to establish the behavior of the adsorption industry standard for comparison. FIG. 1 shows the Freundlich isotherm plot, and derived parameters are:

n=1.001, and $K_f$=20.05.

EXAMPLE 2

Figure 2:
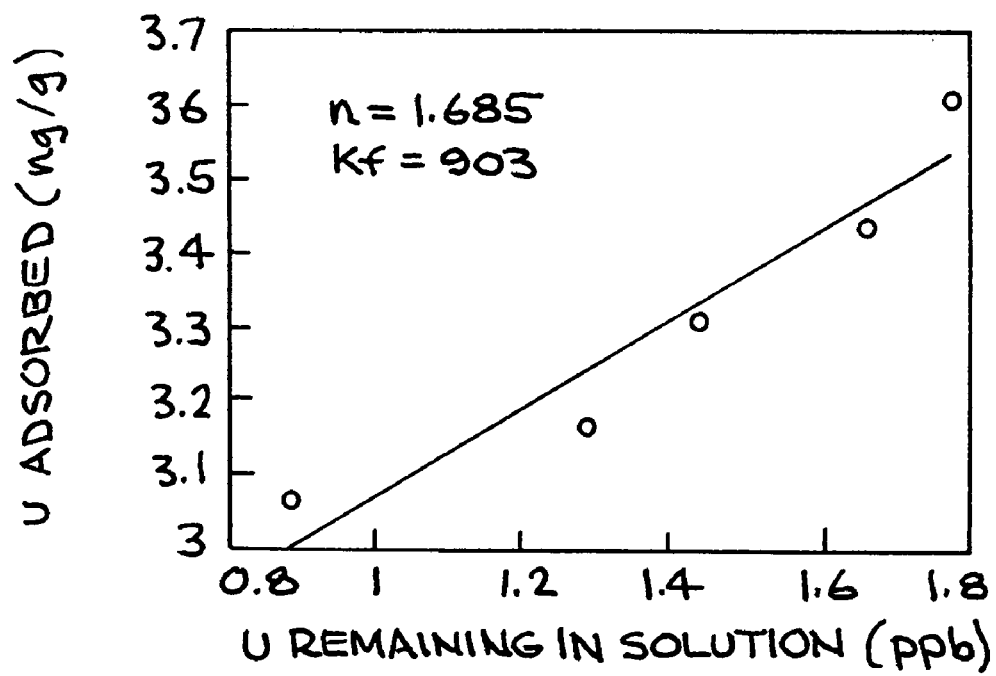
FIG. 2 shows a Freundlich isotherm plot for a 1% phosphoric acid and hydrophobic aerogel/GAC composite.

1% phosphoric acid and hydrophobic aerogel was prepared by the following method: 14.7 g $(CH_3O)_4Si$ and 3.14 g $(CH_3O)_3SiCH_2CH_2CF_3$ were mixed together and to this mixture, 18.0 g $CH_3OH$ were added and stirred. In a separate vessel, 36.0 g $CH_3OH$, 0.147 g $H_3PO_4$, 1.5 g $HBF_4$ were mixed together and stirred. After about 1 min., both solutions were poured into a supercritical-drying reactor containing 13.4 g of GAC. A vacuum was pulled, and the mixture gelled in less than 1 hour. The gelled mixture was then supercritically dried at 300° C. FIG. 2 shows the Freundlich isotherms and the derived parameters are: n=1.685, $K_f$=303.

EXAMPLE 3

Figure 3:
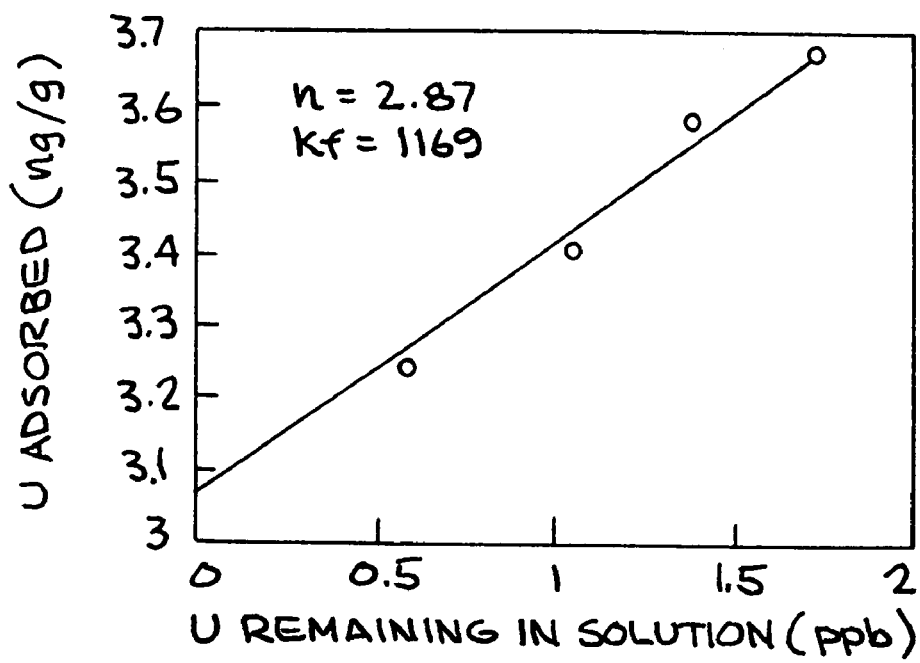
FIG. 3 shows a Freundlich isotherm plot for a 17% phosphoric acid and hydrophobic aerogel/GAC composite.

17% phosphoric acid and hydrophobic aerogel was prepared by the following method: 14.7 g $(CH_3O)_4Si$ and 3.14 g $(CH_3O)_3SiCH_2CH_2CF_3$ were mixed together and to this mixture, 18.0 g $CH_3OH$ were added and stirred. In a separate vessel, 36.0 g $CH_3OH$, 2.5 g $H_3PO_4$, 1.5 g $HBF_4$ were mixed together and stirred. After about 1 min., both solutions were poured into a supercritical-drying reactor containing 13.4 g of GAC. A vacuum was pulled, and the mixture gelled in less than 1 hour. The gelled mixture was then supercritically dried at 300° C. FIG. 3 shows the Freundlich isotherms and the derived parameters are: n=2.87, $K_f$=1169.

EXAMPLE 4

Figure 4:
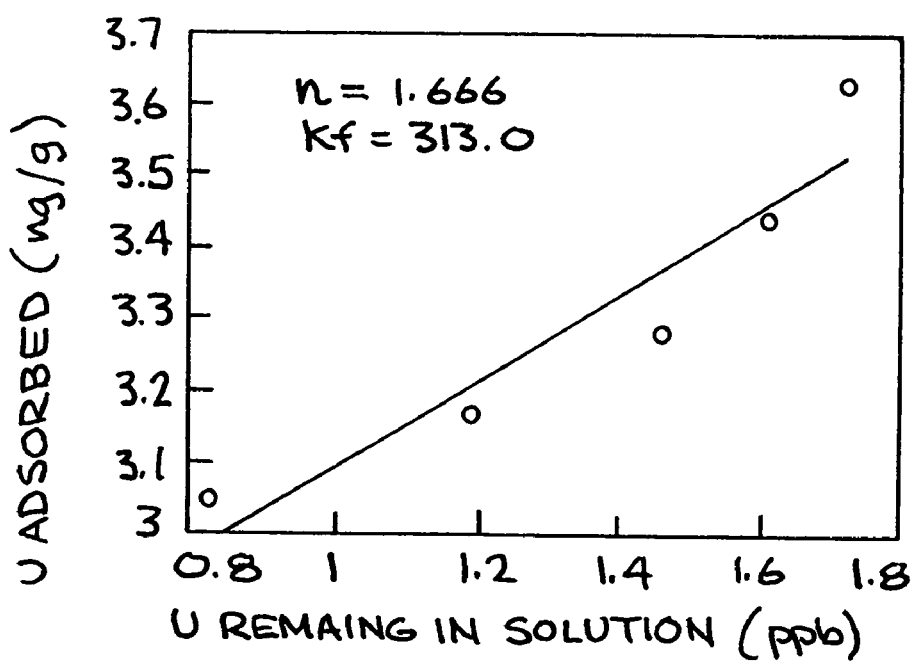
FIG. 4 shows a Freundlich isotherm plot for a phosphoric acid exchanged hydrophobic aerogel/GAC composite.

Phosphoric acid exchanged hydrophobic aerogel was prepared by the following method: 35.0 g $(CH_3O)_4Si$ and 7.55 g $(CH_3O)_3SiCH_2CH_2CF_3$ were mixed together and to this mixture, 44.1 g acetone were added and stirred. In a separate vessel, 30.9 g $H_2O$, 85.7 g acetone, 7.46 g $Ca(NO_3)_2$, 0.1 g $HBF_4$ were mixed together and stirred. After about 1 min., both solutions were poured into a supercritical-drying reactor containing 96.2 g of GAC. A vacuum was pulled, and the mixture gelled in less than 1 hour. The gelled mixture was then supercritically dried at 300° C. The dry sample was removed from the supercritical reactor, sieved to remove very fine particulates, and mixed with a 5% $H_3PO_4$ in acetone solution for 5 to 10 min. The solvent was decanted off, and the solid was washed with pure acetone and dried under vacuum. FIG. 4 shows the Freundlich isotherms and the derived parameters are: n=1.666, $K_f$=313.

EXAMPLE 5

Figure 5:
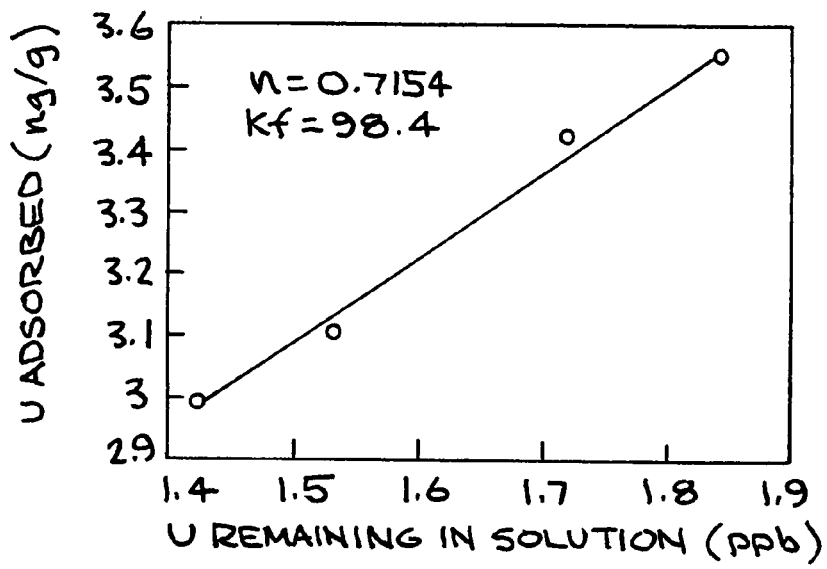
FIG. 5 shows a Freundlich isotherm plot for a functionalized phosphonate hydrophobic aerogel/GAC composite.

Functionalized phosphonate hydrophobic aerogel was prepared by the following method: 29.5 g $(CH_3O)_4Si$, 6.3 g $(CH_3O)_3SiCH_2CH_2CF_3$, and 6.3 g $(C_2H_5O)_3SiCH_2CH_2P(O)(OC_2H_5)_2$ were mixed together, and to this mixture, 36.0 g $CH_3OH$ were added and stirred. In a separate vessel, 17.5 g $H_2O$, 90.0 g $CH_3OH$, 0.0175 g $NH_4OH$ were mixed together and stirred. After about 1 min., both solutions were poured into a supercritical-drying reactor that contained 8.49 g of GAC. The mixture was then supercritically dried at 300° C. FIG. 5 shows the Freundlich isotherms and the derived parameters are: n=0.715, $K_f$=98.4.

EXAMPLE 6

Figure 6:
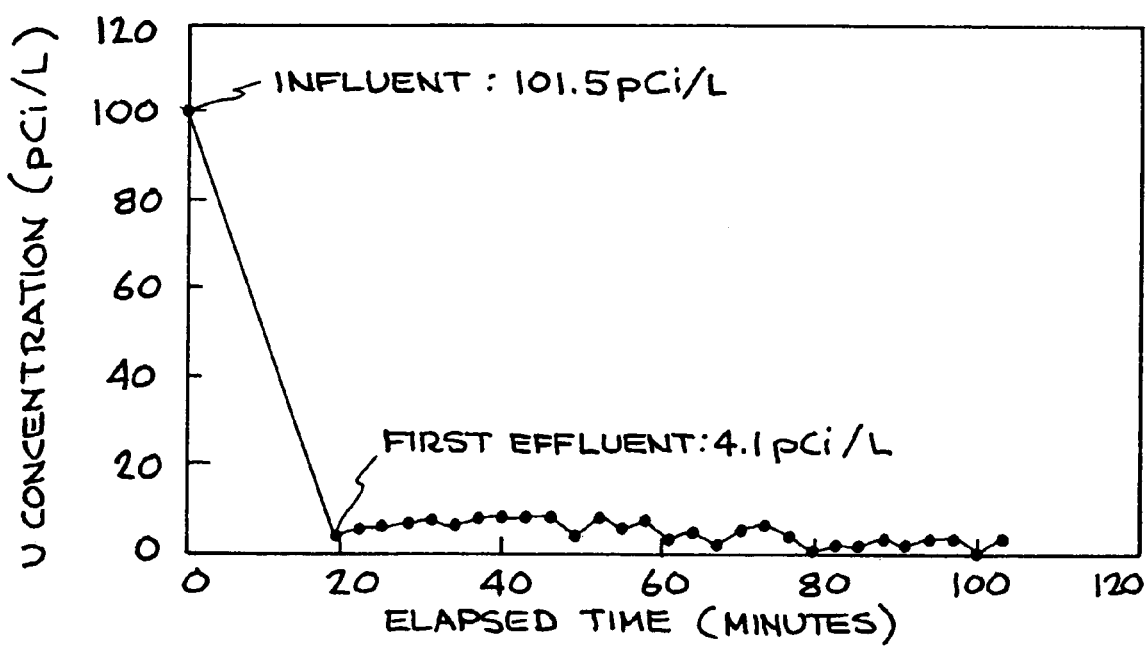
FIG. 6 shows a column test for a functionalized phosphate hydrophobic aerogel.

Uranium Removal 50 g of the aerogel/GAC composite from Example 3 was tested in a column reactor. A 101 pCi/L uranium solution at pH 7 was treated in a up-flow configuration. FIG. 6 shows the concentration of uranium in the effluent as a function of time on stream. The concentration was immediately reduced to 4 pCi/L and remained at that level through the entire run.

EXAMPLE 7

Figure 7:
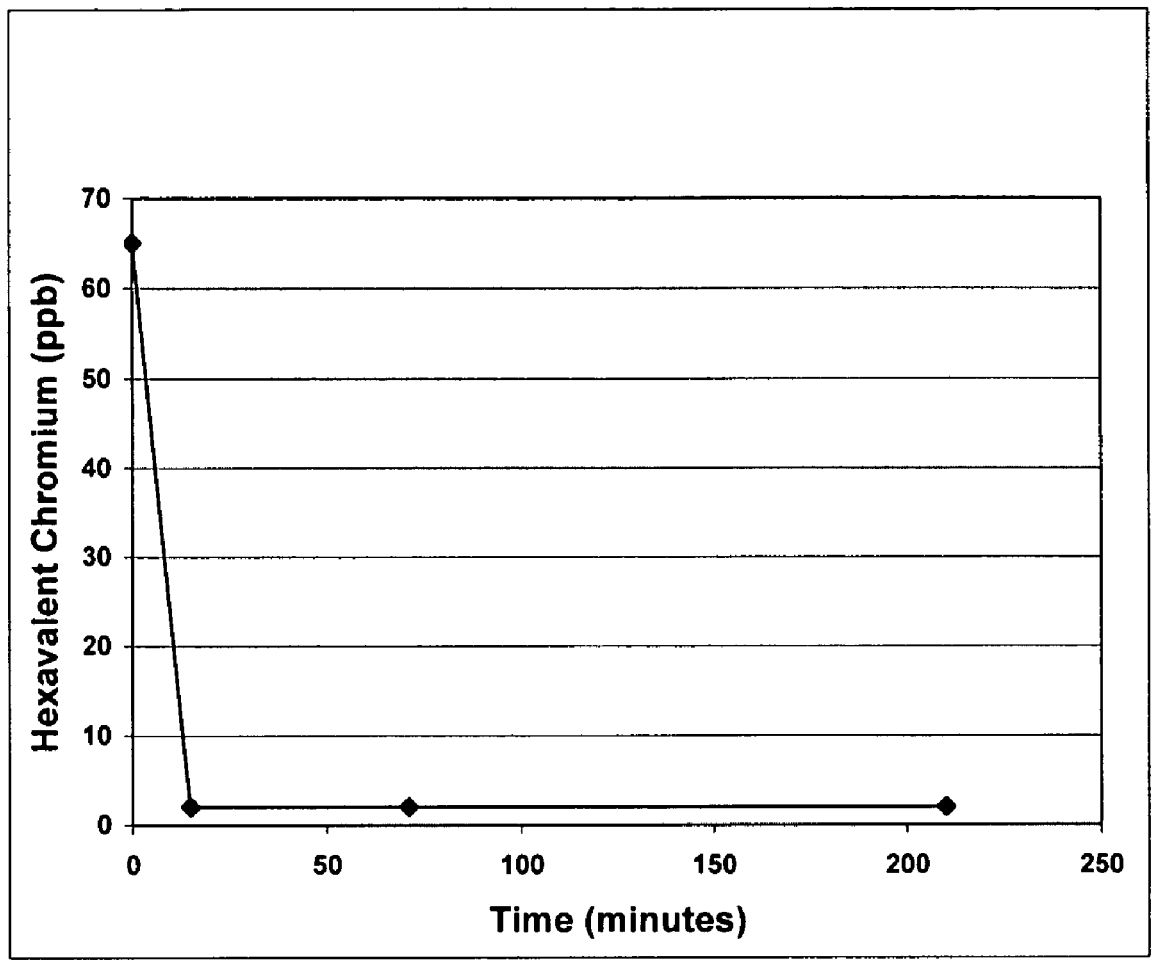
FIG. 7 shows the results of a chromium adsorption column test using a column loaded with a 17% phosphoric acid and hydrophobic aerogel/GAC composite.

Chromium Removal 35.7 g of the aerogel/CAC composite from Example 3 was tested in a column reactor. A 95 µg/L hexavalent chromium solution at pH 5.1 was treated in an up-flow configuration. FIG. 7 shows the concentration of hexavalent chromium in the effluent as a function of time on stream. The concentration was immediately reduced to less than 2 µg/L (the detection limit) and remained below detection limit of the instrumentlimit through the entire run.

EXAMPLE 8

Figure 8A:
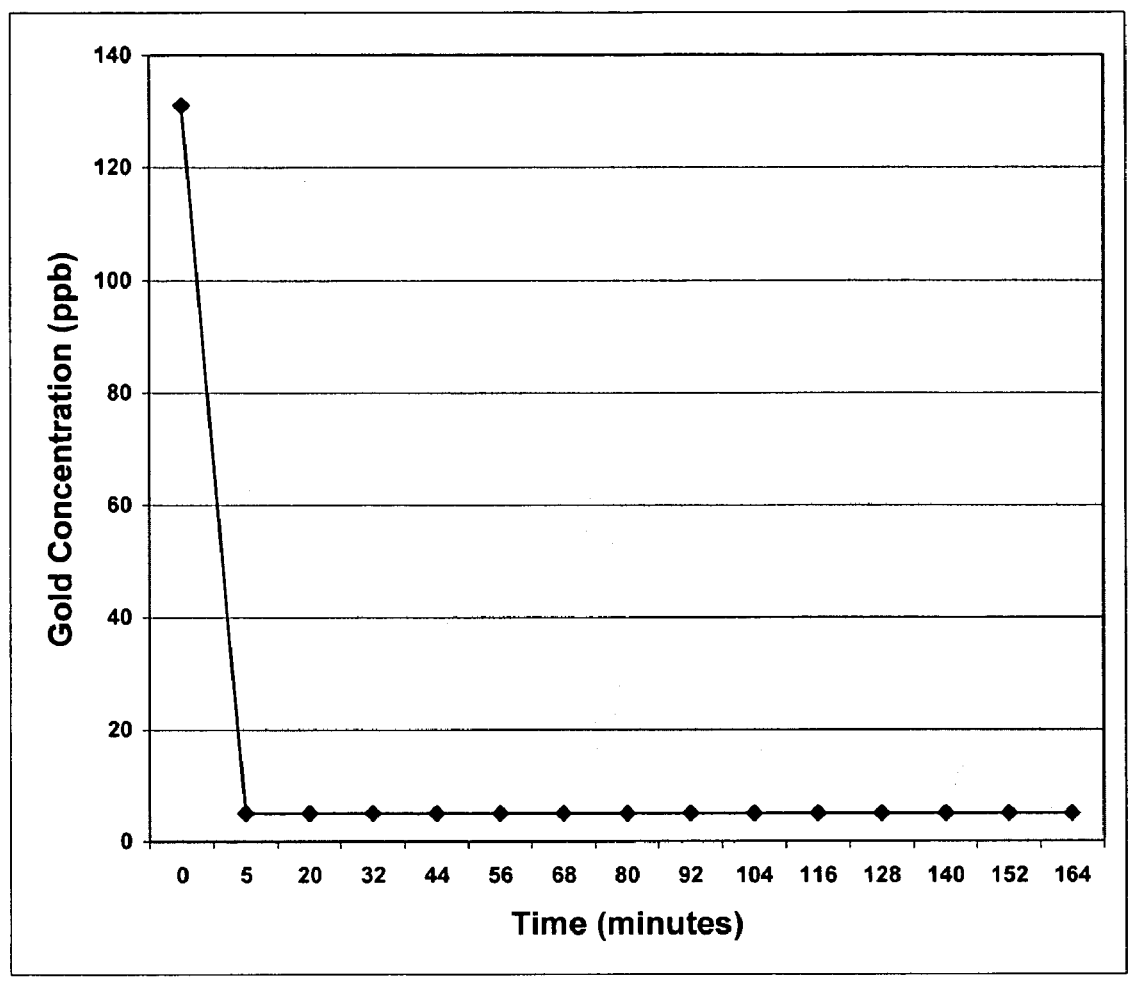
FIGS. 8a and 8b show the results of a gold adsorption column test using a column loaded with a 17% phosphoric acid and hydrophobic aerogel/GAC composite.
Figure 8B:
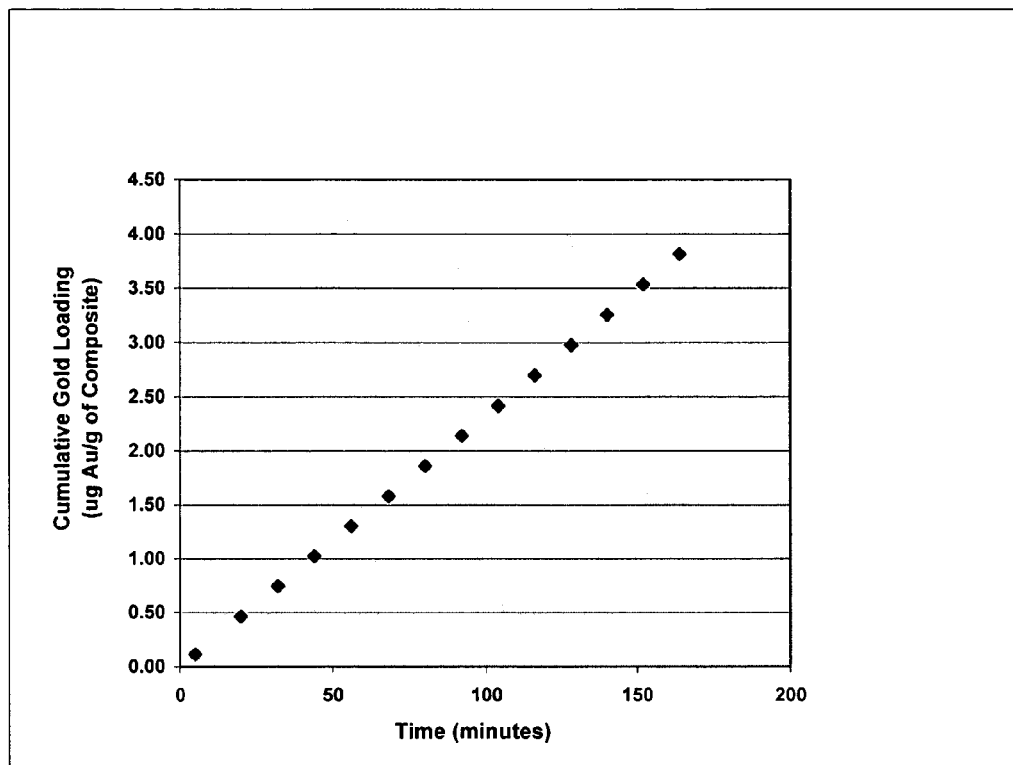

Gold Removal 5.4 g of the aerogel/GAC composite from Example 3 was tested in a column reactor. A 13 µg/L gold solution at pH 7 was treated in an up-flow configuration. The results of a gold adsorption column test using 5.4 grams of the Aerogel/GAC composite with a flow rate=1 ml/min and a 1 cm diameter, 15 cm length column are shown in FIGS. 8a and 8b. FIG. 8a shows the concentration of gold in the effluent as a function of time on stream. The concentration was immediately reduced to less than 5 µg/L (the detection limit of the instrument) and remained below the instrument's detection limit through the entire run. FIG. 8b shows the accumulation of gold loaded onto the column as a function of time.

EXAMPLE 9

VOC Removal

17% phosphoric acid and hydrophobic aerogel was prepared by the following method: 14.7 g $(CH_3O)_4Si$ and 3.14 g $(CH_3O)_3SiCH_2CH_2CF_3$ were mixed together and to this mixture, 18.0 g $CH_3OH$ were added and stirred. In a separate vessel, 0.01 g of NH$_4$OH was mixed with water. After about 1 min., both solutions were poured into a supercritical-drying reactor containing 60 g of GAC. A vacuum was pulled, and the mixture gelled in less than 1 hour. The gel was placed in a reactor under super critical conditions and dried. This formulation was used to generate approximately 300 g of the aerogel/GAC composite.

293.5 g of the aerogel/GAC composite from Example 9 was tested in a 17 cm in length by 6.2 cm diameter stainless steel column to remove volatile organic compounds from soil vapor in the field. Starting concentrations ranged from approximately 290 to 300 ppmv for the combined contaminants of 1,1-DCE, TCE and PCE. The treated vapor stream had a combined contaminant concentration of 20 ppmv and less. FIG. 9 is a table that shows the results of one day of this column test.

Composite Characterization

FIG. 10 shows the results of elemental analysis of powdered samples of the hydrophobic aerogel/GAC composites described above. The elemental analysis was conducted by Galbraith Laboratories, Inc.

Figure 11B:
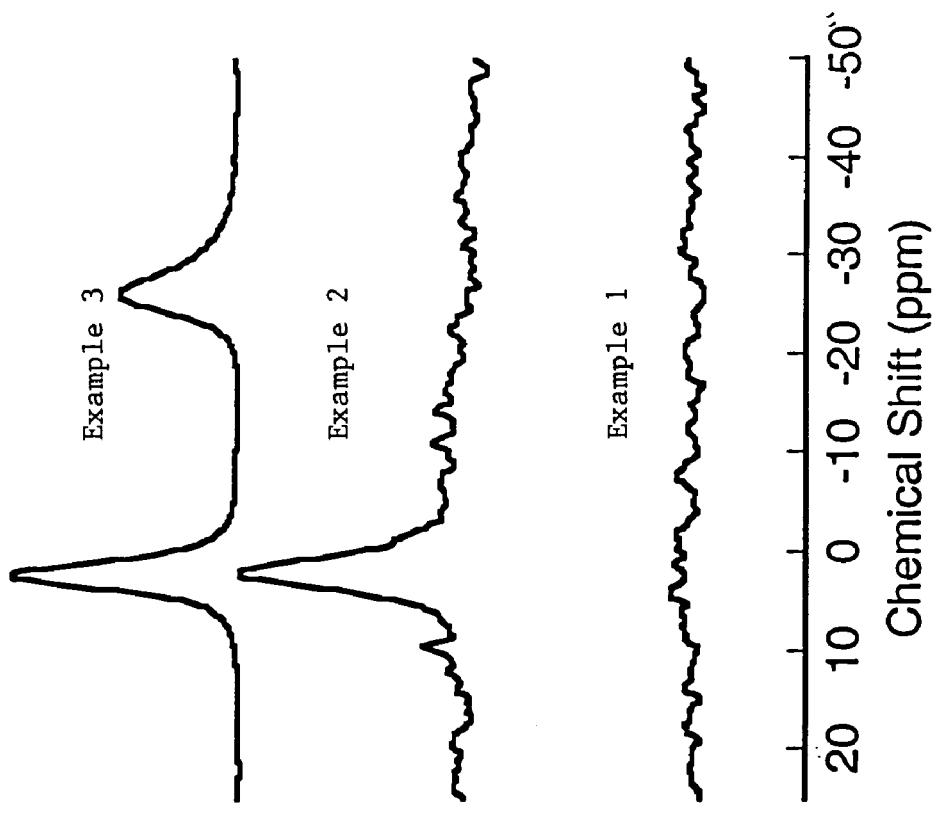
FIGS. 11a and 11b show the results of NMR analysis of phosphate modified aerogel/GAC composites.
Figure 11A:
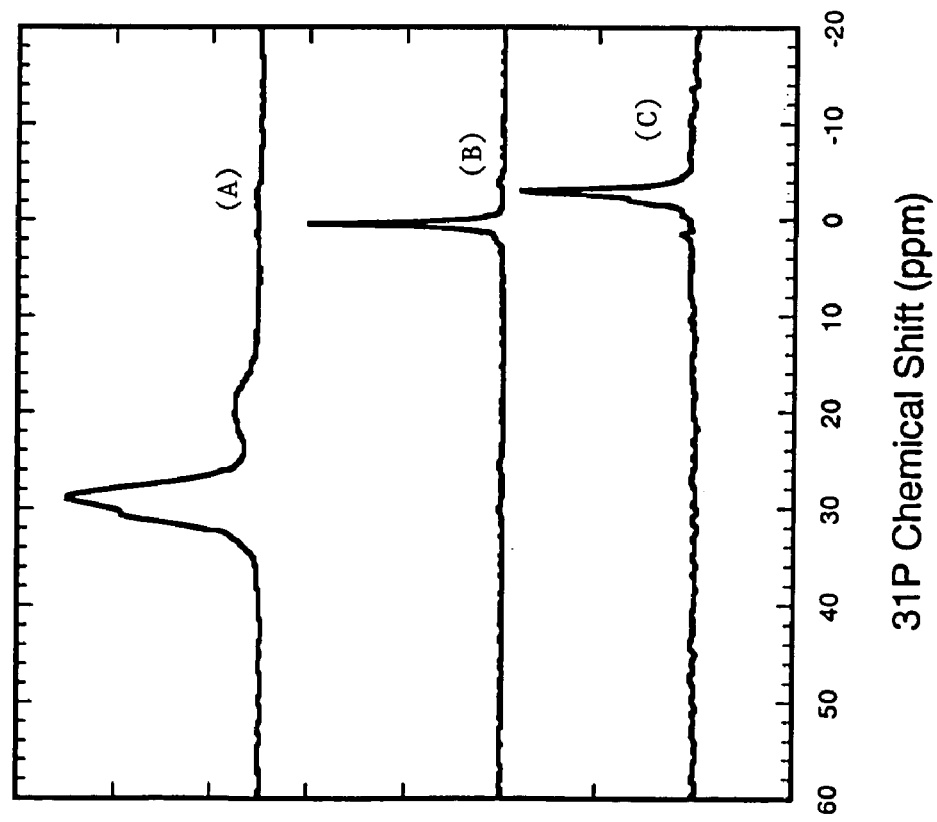

FIG. 11a shows the results of MAS $^{31}$P NMR analysis of a phosphonate modified aerogel (A), a Ca(NO$_3$)$_2$ modified aerogel (B) and a 17% H$_3$PO$_4$ modified aerogel (C). FIG. 11b shows the results of solid state NMR analysis of Example 3, Example 2, and Example 1. The Example 2 spectrum shows that phosphate has definitely been incorporated into the composite and the spectrum of Example 3 shows the possibility that pyrophosphates have been incorporated into the composite (see peak between −20 and −30 ppm).

Figure 12A:
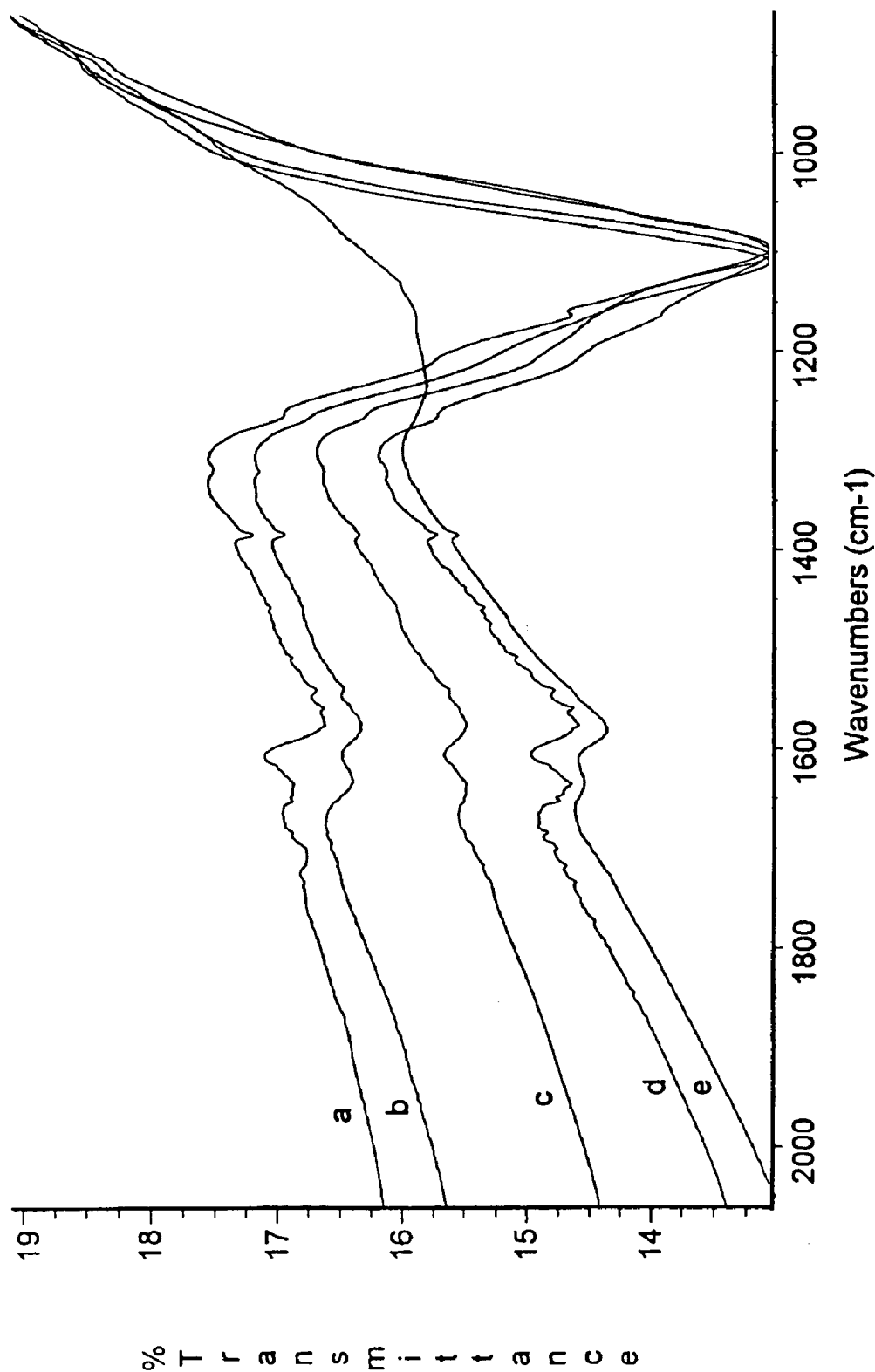
FIGS. 12a and 12b show the results of infrared analysis of various aerogels and aerogel/GAC composites.

FIG. 12a shows the results of IR analysis of Example 1(e), Example 2(b), Example 3(a), Example 4(c) and Example 5(d). The evidence of Si incorporation is apparent with the prominent feature at 1100 cm$^{-1}$. The features at 1576 and 1635 cm$^{-1}$ are due to C═C and C—O and are typically due to the carbon and are essentially all the same in all the spectra. The 17% H$_3$PO$_4$ spectrum (a) does have an added feature at 1710 cm$^{-1}$. This is also seen in activated carbons that have been additionally activated by acids.

Figure 12B:
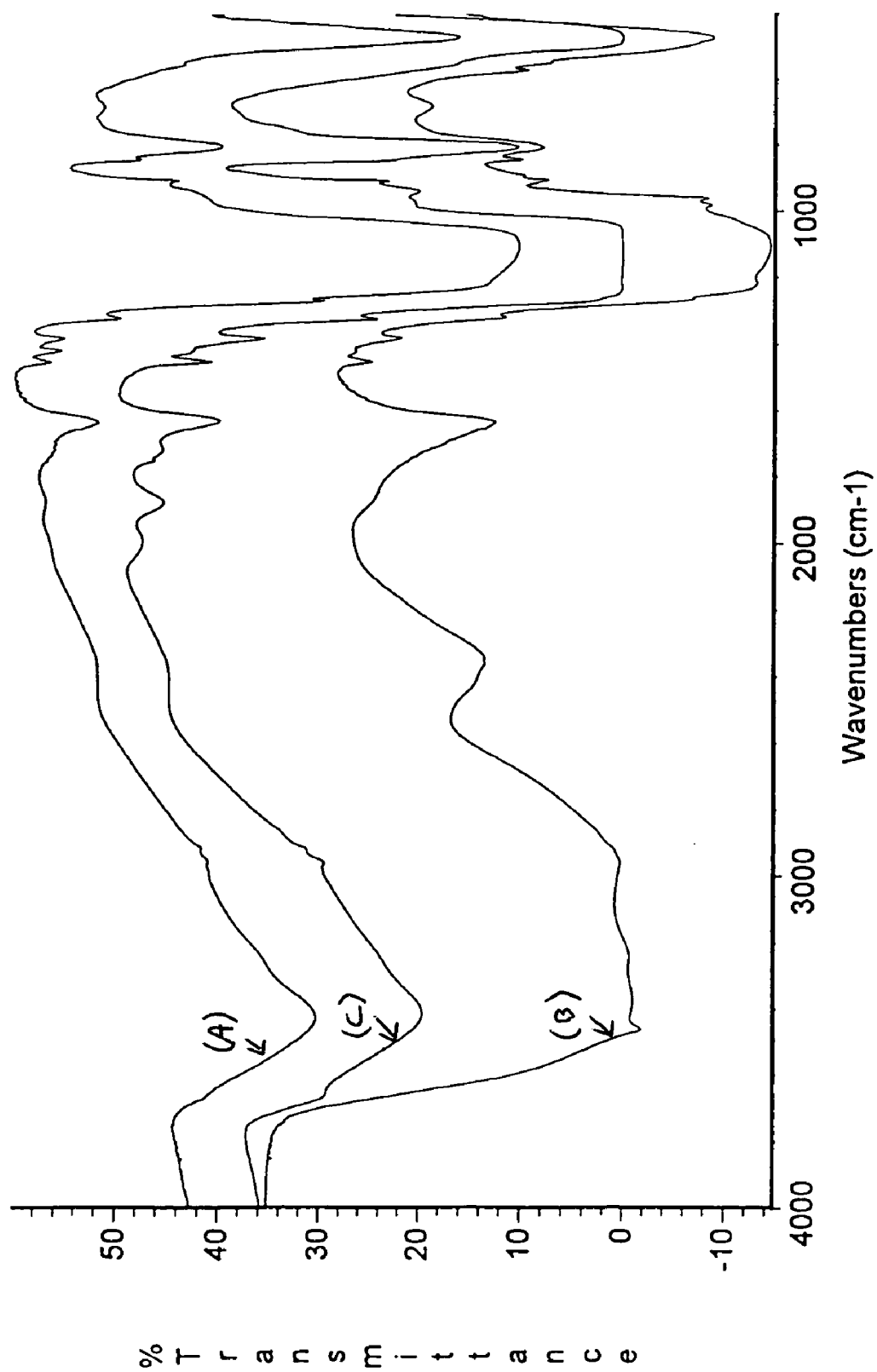

FIG. 12b shows the results of IR analysis of a phosphonate modified aerogel without the carbon component (A), a Ca(NO$_3$)$_2$ modified aerogel without the carbon component (B) and a 17% H$_3$PO$_4$ modified aerogel without the carbon component (C). Because the bulk composition is mostly carbon, the modified aerogels are shown without the carbon component. The spectra for all three are dominated by aerogel framework as characterized by the very strong, broad feature at 1100 cm$^{-1}$, for example. The propyl-CF$_3$ component is seen, with characteristic features at 808, 1215, and 1316 cm$^{-1}$. Some indication of phosphorus structure is shown as a broad feature around 2400 cm$^{-1}$.

It has thus been shown that the aerogel (sol-gel) and granulated activated carbon (GAC) mixtures or composites provide a significant increase in adsorption of metals (e.g., uranium, chromium, and gold) and VOCs over that of GAC or aerogel material alone. Thus, this invention enables removal of materials such as uranium, chromium, gold, and VOCs. If the materials are being removed to decontaminate, the aerogel/GAC compositions enable the removal the above-listed materials in addition to contaminants that can be adsorbed by GAC alone (e.g., VOCs and trihalomethanes (THMs)), thereby enabling multiple contaminant removal with the same material.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While particular examples have been set forth with particular materials, times, etc. to exemplify and teach the principles of the invention, such are not intended to be limiting. Modifications and changes may become apparent to those skilled in the art, and it is intended that the invention be limited only by the scope of the appended claims.

What is claimed is:

1. A composition comprising:
   a mixture consisting essentially of (1) a hydrophobic sol-gel comprising aerogel, including a quantity of phosphonate, functionalized with at least one metal-removing constituent, and (2) a solid support structure.

2. The composition recited in claim 1, wherein said solid support structure is molded, granular, or powdered.

3. The composition recited in claim 1, wherein the hydrophobic aerogel includes a quantity of phosphoric acid.

4. The composition recited in claim 1, wherein the hydrophobic aerogel is produced by adding a predetermined amount of phosphoric acid to a siloxane sol-gel mixture prior to gellation.

5. The composition recited in claim 3, wherein the concentration of phosphoric acid of the hydrophobic aerogel ranges from 0.5% to 50%.

6. The composition recited in claim 4, wherein the concentration of phosphoric acid added prior to gellation ranges from 0.5% to 50%.

7. The composition recited in claim 1, wherein the quantity of phosphonate incorporated in the aerogel is formed from the starting material (C$_2$H$_5$O)$_3$SiCH$_2$CH$_2$P(O)(OC$_2$H$_5$)$_2$.

8. The composition recited in claim 1, wherein the concentration of phosphonate in the hydrophobic aerogel ranges from 0.5% to 50%.

9. The composition recited in claim 1, wherein the hydrophobic aerogel includes a quantity of phosphate exchangeable metal salt, said hydrophobic aerogel being functionalized by washing with a pre-determined amount of phosphoric acid.

10. The composition recited in claim 9, wherein the phosphate exchangeable salt is calcium nitrate.

11. The composition recited in claim 9, wherein the concentration of the phosphate exchangeable metal salt prior to the phosphoric acid washing ranges from 0.5% to 50%.

12. The composition recited in claim 1, wherein the solid support structure is granulated activated carbon (GAC).

13. The composition recited in claim 10, wherein the GAC is acid washed.

14. A solid composition comprising:
   a predetermined amount of a hydrophobic aerogel functionalized with at least one metal-removing constituent selected from the group consisting of phosphoric acid, phosphonate, and phosphate-exchangeable metal salts; and
   a predetermined amount of granulated activated carbon.

15. A method comprising:
   forming a first mixture comprising a predetermined amount of at least one organosilane compound, a predetermined amount of an organosilane compound having a substituent capable of making an aerogel hydrophobic, and an organic solvent;

forming a second mixture comprising a compound capable of binding at least one metal or a compound capable of being modified to a compound capable of binding at least one metal alter gellation and an organic solvent;

mixing the first mixture and the second mixture together with stirring for a predetermined amount of time to form a pre-aerogel mixture;

combining said pre-aerogel mixture with a predetermined amount of a solid support structure to form a pre-aerogel/support structure mixture; and drying said pre-aerogel/support structure under supercritical conditions to form a functionalized hydrophobic aerogel/support structure solid material capable of removing metals from an aqueous media.

16. The method recited in claim 15, wherein said solid support structure is granulated activated carbon (GAC).

17. The method recited in claim 16, wherein said GAC is acid washed.

18. The method recited in claim 15, wherein said compound capable of binding at least one metal is selected from the group consisting of a predetermined amount of phosphoric acid and a compound containing a phosphonate.

19. The method recited in claim 15, wherein said compound capable of being modified to a compound capable of binding at least one metal after gellation is a phosphate exchangeable salt.

20. The method recited in claim 19, wherein said phosphate exchangeable salt is calcium nitrate.

21. The method recited in claim 15 wherein said compound is a phosphonate.

22. A method comprising:

providing a hydrophobic aerogel solid support structure, wherein said hydrophobic aerogel includes a quantity of phosphonate and is functionalized with at least one metal-removing constituent and/or at least one VOC-removing constituent;

contacting said hydrophobic aerogel on a solid support structure to an aqueous or vapor sample; and analyzing said hydrophobic aerogel on a solid support structure after contacting it with said sample in order to the detect the presence and/or concentration of metals and/or VOCs.

23. The method recited in claim 22, wherein the hydrophobic aerogel includes a quantity of phosphoric acid.

24. The method recited in claim 23, wherein the concentration of phosphoric acid of the hydrophobic aerogel ranges from 0.5% to 50%.

25. The method recited in claim 22, wherein the concentration of phosphonate in the hydrophobic aerogel ranges from 0.5% to 50%.

26. The method recited in claim 22, wherein the hydrophobic aerogel includes a quantity of phosphate exchangeable metal salt, said hydrophobic aerogel being functionalized by washing with a pre-determined amount of phosphoric acid.

27. The method recited in claim 26, wherein the phosphate exchangeable salt is calcium nitrate.

28. The method recited in claim 27, wherein the concentration of the phosphate exchangeable metal salt prior to the phosphoric acid washing ranges from 0.5% to 50%.

29. The method recited in claim 22, wherein the solid support structure is granulated activated carbon (GAC).

30. The method recited in claim 29, wherein the GAC is acid washed.

* * * * *